Figure 1:
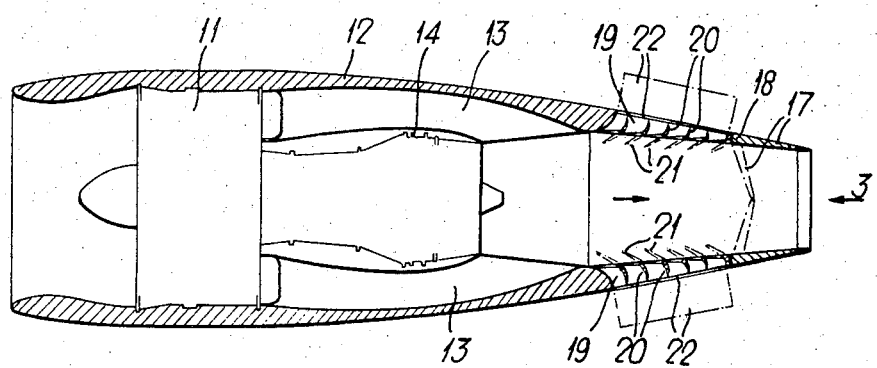

United States Patent
Blythe et al.

[11] 3,806,068
[45] Apr. 23, 1974

[54] AIRCRAFT

[75] Inventors: Alan Avery Blythe, St. Albans; Michael Edward Grace, Hatfield, both of England

[73] Assignee: Hawker Siddeley Aviation Limited, Kingston-upon-Thames, Surrey, England

[22] Filed: Feb. 28, 1972

[21] Appl. No.: 229,983

[30] Foreign Application Priority Data
Mar. 1, 1971 Great Britain.................. 5692/71

[52] U.S. Cl. ............................ 244/53 R, 244/12 D
[51] Int. Cl. ...................... B64b 1/24, B64d 29/00
[58] Field of Search ..................... 244/53 R, 12 D; 239/265.27, 265.29, 265.31; 60/228, 230, 229

[56] References Cited
UNITED STATES PATENTS

| | | | |
|---|---|---|---|
| 3,716,207 | 2/1973 | Schweiki et al. | 244/53 R |
| 3,068,646 | 12/1962 | Fletcher | 60/35.6 |
| 3,596,836 | 8/1971 | Dennig et al. | 239/456 |
| 3,603,090 | 9/1971 | Billinger et al. | 60/226 |
| 3,248,878 | 5/1966 | Clark et al. | 60/35.54 |

Primary Examiner—Duane A. Reger
Assistant Examiner—D. C. Butler
Attorney, Agent, or Firm—Rose & Edell

[57] ABSTRACT

A high bypass ratio gas turbine engine for V/STOL aircraft propulsion has a central nozzle of rectangular cross-section for discharging the hot gas efflux and two flanking nozzles, also of rectangular cross-section, for discharging the cold bypass air, and each of the three nozzles is provided with a separate efflux deflection device for directing the efflux rearwardly and/or downwardly and/or upwardly in controllable rations. Each deflection device consists of rear end plug-type doors, that form parts of the nozzle duct walls when open, and openings in the lower and upper duct walls immediately forward of the plug doors. The openings are fitted with cascades, external doors and internal louvre-type doors.

5 Claims, 8 Drawing Figures

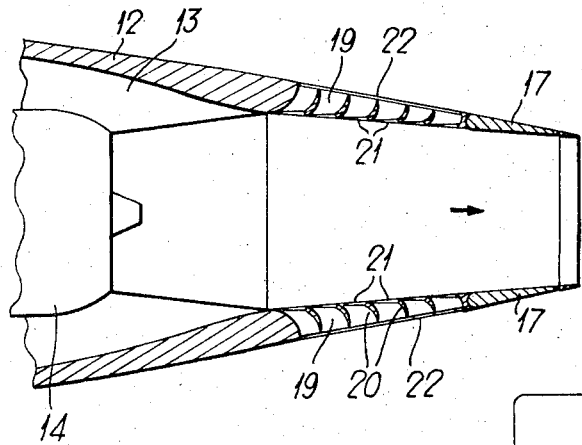
Fig. 4a.
Fig. 3.
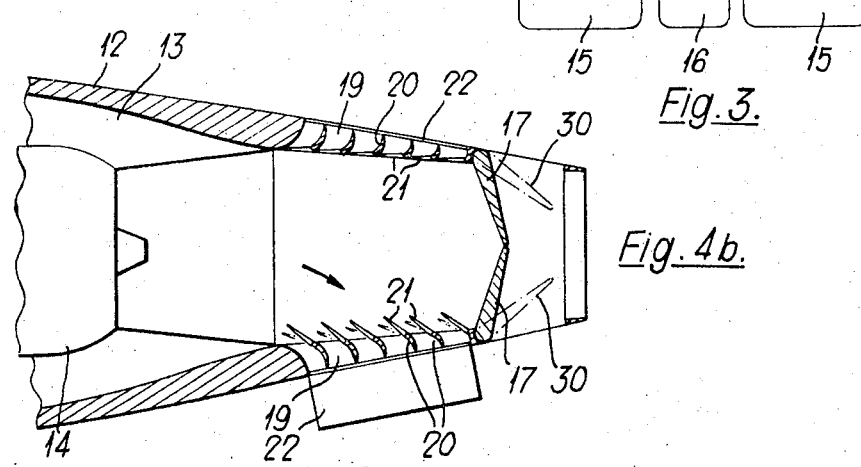
Fig. 4b.
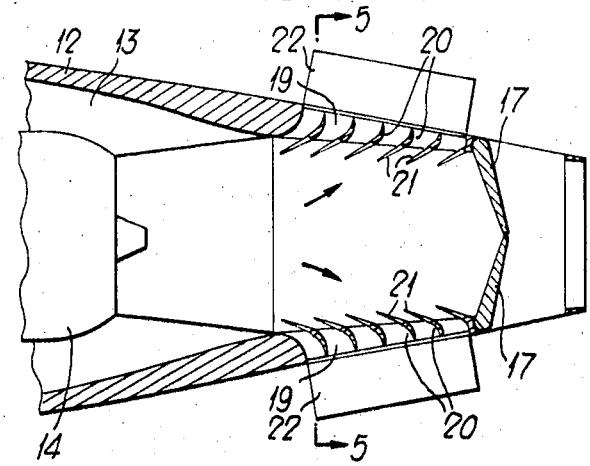
Fig. 4c.

AIRCRAFT

This invention relates to aircraft of the V/STOL or VTOL type. More particularly, it is concerned with those aircraft which obtain their lifting thrust by a combination of direct lift gas turbine engines or fan units and the deflected thrust of forward propulsion gas turbine engines.

The cost of the engines is a large proportion of the capital cost of a V/STOL transport. Engine maintenance costs are related to engine capital cost so that it can be advantageous to reduce, where possible, the number of direct lift engines employed. This will similarly lead to a reduction in direct operation costs and a simplification of the aircraft and its systems.

To this end it has been proposed to augment the lifting thrust of direct lift engines by deflecting the thrust of the forward propulsion engines fully downward. This technique is most useful when the propulsion engines are located at the rear of the fuselage where they can be given the ability to direct their thrust vertically up or down to impart powerful roll and pitch control, in addition to their function of augmenting lift. However, no such scheme will be tolerable if the presence of the jet deflection devices significantly impedes the rearward flow of the jet effluxes during normal cruise flight or gives materially increased drag.

According to the present invention, there is provided a jet efflux deflection device which for normal cruise flight is retractible to give uninterrupted flow but which can be progressively applied, at will, to give a vertical or near vertical component of thrust, and other degrees of deflection between the horizontal and the vertical.

The most economical of modern jet propulsion gas turbine engines for air transport is the high bypass ratio engine. If the jet deflector acts on the combined flow of such an engine, the bypass and hot jet pressures and velocities need to be matched both for normal cruise operation and at maximum engine thrust. The higher the bypass ratio the more difficult this becomes. In addition, the deflector arrangements are heavy because the whole system has to be designed to deal with the hot efflux. We are therefore proposing herein a deflector arrangement to deal with this problem.

In a modern high bypass ratio gas turbine engine the bypass air duct may be bifurcated laterally to pass on either side of a centrally located gas generator, the bypass branches developing into two substantially rectangular nozzles for the cold bypass flow located immediately next to either side of a similarly rectangular nozzle extending rearwardly from the gas generator. All three nozzles are horizontally disposed.

According to a feature of the invention, when applied to a high bypass ratio engine, separate deflector assemblies are provided for the cold bypass and hot jet flows.

In the preferred arrangement, deflection of the efflux is obtained by swinging into the thrust line upper and lower plug type doors that are normally contained in and form part of each nozzle duct, the several upper doors, and likewise the several lower doors, being pivotally mounted at their forward ends on the duct structure about a common hinge centre. With the plug doors closed the jet efflux is turned into a vertical or near vertical direction, being ejected through an aperture or apertures in the upper and/or lower surfaces of each duct, which apertures may have a number of fixed transverse cascades to give a controlled change of gas flow direction. Each aperture may be further provided, at its outer profile, with a pair of longitudinally hinged outwardly-opening doors and, at its inner profile, with a number of transverse louvres pivotally mounted in general alignment with the fixed cascades, so that when the doors and louvres are closed they form panels giving uninterrupted inner and outer duct surfaces. Therefore, during normal cruise flight these form an aerodynamically acceptable surface for both the jet efflux and the external air flow. There may also be an interconnection between the aperture doors and louvres and the plug doors so that the total efflux area remains constant during the various phases of operation.

During the transition from normal forward flight to vertical lift of low speed flight the plug doors are gradually closed, the lower aperture doors and louvres simultaneously opening until all the efflux is transfered to the lower cascades which deflect the thrust into a vertical or near vertical direction. Lift is modulated by differentially varying the areas of the top and bottom apertures. When a download is required the top doors are opened and the bottom doors are closed until the efflux area of the top apertures exceeds that of the bottom. The central duct and deflector doors operate in the hot airflow so that stainless steel or titanium components must be used in this region. For those ducts and deflectors only in contact with the cool bypass air, aluminium alloy or any other acceptable light structural material can be used with an appreciable weight saving.

Figure 2:
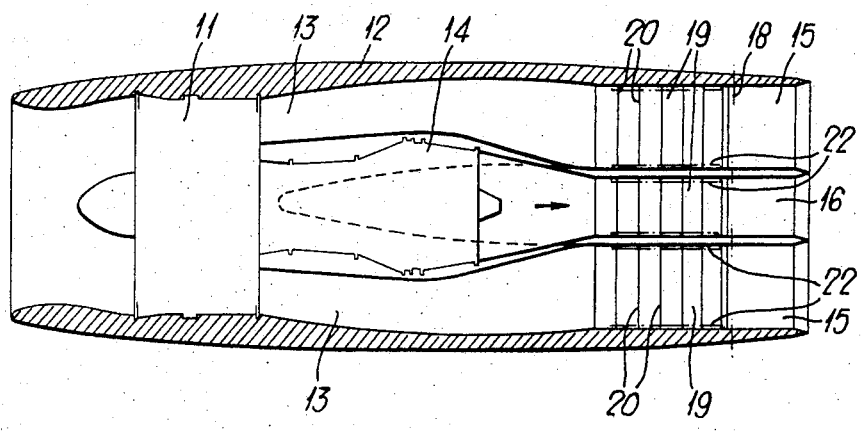
Figure 5:
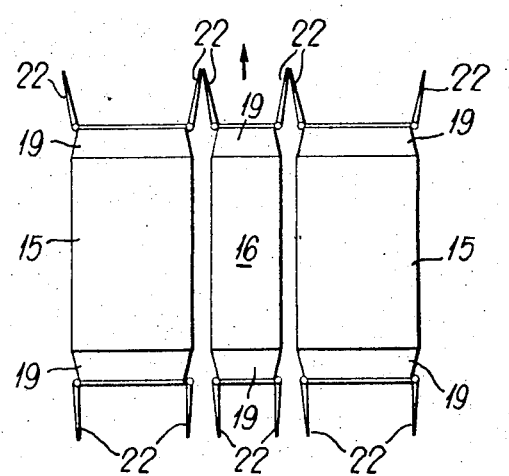
Figure 6:
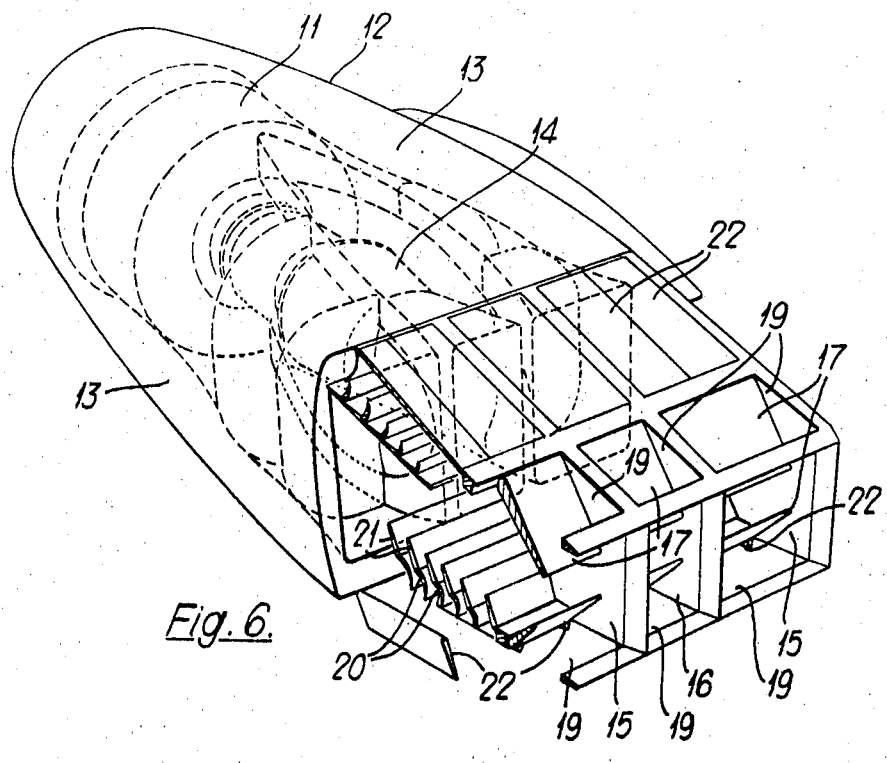

One arrangement in accordance with the invention will now be described by way of example, with reference to the accompanying drawings, in which:

FIG. 1 is a diagrammatic side elevation of a high bypass ratio jet propulsion engine, FIG. 2 is a plan view of the same engine, FIG. 3 is a view in the direction of the arrow 3 of FIG. 1, showing the disposition of the three nozzles, FIGS. 4a, 4b and 4c are three part side elevations of the engine for three operating conditions, FIG. 5 is a section through the engine along the line 5—5 of FIG. 4c showing the outer doors, and FIG. 6 is a rear perspective view of the engine.

FIGS. 1, 2, 3 and 6 show a high bypass ratio engine 11 contained within a pod or casing 12. The bypass airflow duct 13 is bifurcated in plan view to pass either side of a gas generator 14, the bypass duct branches developing into two rectangular nozzles 15 one on each side of a middle rectangular nozzle 16 extending from the gas generator 14. upper and lower plug doors 17 are pivotally mounted at the exit of each duct at 18; when these doors are open they form rearward continuations of the inner and outer profiles of the ducts, as shown in FIGS. 1 and 4a. Immediately forward of the plug doors 17 are upper and lower thrust apertures 19 each containing a number of fixed cascades 20. Inner transverse louvre type doors 21 are pivotally mounted on the cascades, or in the case of the most aft louvre, on the local duct structure. Outer aperture doors 22 are longitudinally hinged in pairs along the top side edge members of said duct.

FIGS. 4a, 4b and 4c illustrate three operating conditions for the deflector system. FIG. 4a shows the cruise condition with all doors retracted and the louvres closed off to give an uninterrupted forward propulsive thrust. FIG. 4b shows the vertical lift setting with the plug doors 17 fully closed, the upper aperture in each duct fully closed and the lower aperture fully open. A transition setting is indicated in broken lines at 30 with the plug doors and lower louvres partially opened. FIG. 4c illustrates a downward thrust setting. The plug doors 17 are again fully closed but a differential variation in upper and lower louvre opening gives a greater upper aperture area in relation to the lower aperture area. This results in a greater amount of the jet efflux passing through the upper apertures and consequently a resultant down thrust.

Many other combinations of settings of the doors and aperture openings are possible, giving a wide range of thrust conditions for attitude and manoeuvring control.

What we claim is:

1. A jet engine nozzle structure, comprising: a tail pipe having an end exit opening and also upper and lower gas exit apertures in its upper and lower walls, at least one pair of plug doors having hinge connections to said walls aft of said exit apertures, said plug doors forming rearward continuations of said walls when open and being swingable inward to closed positions in which they meet and block off said end exit opening, an upper series of fixed cascade blades disposed in said upper exit aperture and dividing it into a series of passages between said blades, a lower series of fixed cascade blades similarly disposed in said lower exit aperture, and upper and lower series of inward swinging louvres each louvre having its own separate hinge mounting on the inner edge of a respective one of said fixed cascade blades, said louvres being movable from closed positions, in which the louvres combine to form continuous inner wall surfaces of the tail pipe closing off said upper and lower exit apertures, to open positions in which the louvres from inward continuations of their respective cascade blades into the interior of the tail pipe and thereby direct gases in the tail pipe out through said upper and lower gas exit apertures by way of said passages between the fixed cascade blades.

2. A nozzle structure according to claim 1, further comprising outwardly-opening external doors for opening and closing said upper and lower exit apertures.

3. A nozzle structure according to claim 1, wherein the tail pipe cross section is substantially rectangular and divided into a middle section and two side sections, and each said section has its own plug doors, upper and lower gas exit apertures, fixed cascade blades and swinging louvres, as aforesaid.

4. A nozzle structure according to claim 3, wherein the middle section of the tail pipe, for hot turbine efflux, is constructed of heat-resisting metal, such as stainless steel, and the side sections, for cold bypass air, are constructed of a comparatively light-weight material, such as aluminum alloy.

5. A nozzle structure according to claim 1, further comprising a bypass air duct that is bifurcated laterally to form two duct branches that pass one on either side of said tail pipe, each said branch having a respective end exit opening, further having respective upper and lower gas exit apertures in its upper and lower walls, further having a respective pair of plug doors swingable inward to block off said respective end exit opening, further having respective upper and lower series of fixed cascade blades disposed in its respective upper and lower gas exit apertures, and further having respective upper and lower series of swinging louvres hinged on the inner edges of said respective cascade blades and movable between closed positions, in which they close off said respective upper and lower apertures, and open positions, in which they form inward continuations of said respective cascade blades.

* * * * *